United States Patent …

(12) United States Patent
Song et al.

(10) Patent No.: US 12,293,296 B2
(45) Date of Patent: May 6, 2025

(54) ADAPTIVE PATH PLANNING METHOD BASED ON NEUTRAL NETWORKS TRAINED BY THE EVOLUTIONARY ALGORITHMS

(71) Applicants: Dibi (chongqing) Intelligent Technology Research Institute Co., Ltd., Chongqing (CN); Star (Chongqing) Intelligent Equipment Technology Research Institute Co., Ltd., Chongqing (CN)

(72) Inventors: Yongduan Song, Chongqing (CN); Lihui Tan, Chongqing (CN); Lei Fang, Chongqing (CN); Shilei Tan, Chongqing (CN); Shuai Wang, Chongqing (CN)

(73) Assignees: Dibi (Chongqing) Intelligent Technology Research Institute Co., Ltd., Chongqing (CN); Star (Chongqing) Intelligent Equipment Technology Research Institute Co., Ltd., Chongqing (CN)

( * ) Notice: Subject to any disclaimer, the term of this patent is extended or adjusted under 35 U.S.C. 154(b) by 871 days.

(21) Appl. No.: 17/503,743

(22) Filed: Oct. 18, 2021

(65) Prior Publication Data
US 2023/0062408 A1    Mar. 2, 2023

(30) Foreign Application Priority Data

Aug. 24, 2021 (CN) .......................... 202110974360.1

(51) Int. Cl.
G06N 3/086    (2023.01)
G06N 3/044    (2023.01)
G06N 3/045    (2023.01)

(52) U.S. Cl.
CPC ............. G06N 3/086 (2013.01); G06N 3/044 (2023.01); G06N 3/045 (2023.01)

(58) Field of Classification Search
CPC ......... G06N 3/086; G06N 3/045; G06N 3/044
See application file for complete search history.

(56) References Cited

PUBLICATIONS

Shen et al. "A Hybrid Forecasting Model for the Velocity of Hybrid Robotic Fish Based on Back-Propagation Neural Network With Genetic Algorithm Optimization", IEEE Access, 2020, pp. 111731-111741.*

(Continued)

*Primary Examiner* — Li Wu Chang
(74) *Attorney, Agent, or Firm* — Bayramoglu Law Offices LLC (57) ABSTRACT

The invention discloses an adaptive path planning method based on neutral networks trained by the evolutionary algorithms, the neutral network training method comprises input and output of the data acquired by the mobile sensors installed on the mobile robots as the neutral networks, and training and optimization of the recurrent neutral networks based on the evolutionary algorithms; the path planning method refers to the application of the trained neutral networks to the path planning of the mobile robot, the invention effectively improves local quick search capability and global search capability of the algorithms by applying the evolutionary algorithms to the optimization of the recurrent neutral networks, so that the robot can plan a rational path in a dense and uncertain environment.

8 Claims, 2 Drawing Sheets

(56) References Cited

PUBLICATIONS

Noguchi et al. "Path planning of an agricultural mobile robot by neural network and genetic algorithm", CEA, 1997, pp. 187-204.*
Du et al. "Mobile Robot Behavior Controller Based on Genetic Diagonal Recurrent Neural Network", IEEE ICAL, 2007, pp. 2984-2987.*

* cited by examiner

ADAPTIVE PATH PLANNING METHOD BASED ON NEUTRAL NETWORKS TRAINED BY THE EVOLUTIONAL ALGORITHMS

FIELD OF THE INVENTION

The invention relates to the technical field of the motion planning in the mobile robot technology, in particular to an adaptive path planning method based on neutral networks trained by the evolutional algorithms.

BACKGROUND OF THE INVENTION

The target of the autonomous mobile robot is to move purposefully and complete corresponding tasks, without requiring any regulations and changes on the environment, without requiring the precondition of manual intervention. The actual application environment of the mobile robot is often very complex, unstructured and time-varying. There exist some problems, such as communication and response lag, incomplete information.

Evolutional Robotics provides a good solution and method for intelligent robot technology, by enabling the mobile robot to autonomously generate various behavioral ability modules according to environmental characteristics and target, and to adjust the constraint relation between the modules, thereby reaching autonomous fitness to complex environment. The artificial neutral networks have outstanding computing power due to its large-scale parallel distributed structure. The recurrent neutral networks describe systematic nonlinear dynamic behaviors by using the internal state feedback of the network, with very strong dynamic approximation capability. In theory, the nonlinear dynamic behaviors can be used in describing any nonlinear dynamic system. However, by using the defects of the gradient descent algorithms during training, the recurrent neutral networks easily fall into the local optimal solution, and cannot quickly converge to obtain the global optimal solution.

SUMMARY OF THE INVENTION

In view of the above problems in the prior art, the technical problem to be solved by the invention is that: how can the global optimal solution be obtained in the path planning so that the global optimal path can be obtained.

In order to solve the above technical problem, the invention adopts the following technical solution: a neutral network training method based on the evolutional algorithms, comprising the following steps:

S100: Constructing N recurrent neutral networks with the same structure, wherein the structure of the recurrent neutral networks is shown below: the neutral networks adopt the A-tier structure, the input tier has a total of B beurons, the output tier has two outputs, and the neutral networks have a total of C link weights;

Providing with N mobile robots, wherein each mobile robot is installed with the following acquisition structures: the D target sensors are installed on the head of the mobile robot, the same number of the sonic sensors, with a total of E sonic sensors, are respectively installed on both sides of the mobile robot, the D target sensors and the E sonic sensors respectively correspond to the B beurons in the input tier, D+E=B, the data acquired by the D target sensors and the data acquired by the E sonic sensors are input into the B beurons in a corresponding manner.

S200: Optimizing the recurrent neutral networks in S100 by using the evolutional algorithms as follows:

S210: Initializing N recurrent neutral networks and obtaining the kth individual by using the real-number encoding of the C link weights of the tth recurrent neutral network, wherein the kth individual is used as the first-generation chromosome of the evolutional algorithms, that is, paternal chromosome, t=k=1, 2 . . . N.; setting the data acquisition step size of the D target sensors and the E sonic sensors, setting the maximum number of evolutions Gmax, setting the fitness threshold S, setting the number of populations N.

S220: Determining the start point and the target point for N mobile robots, inputting the data acquired by the D target sensors and the data acquired by the E sonic sensors in each mobile robot into the B beurons of the input tier of the recurrent neutral networks in S210 in a corresponding manner, and outputting the linear velocity and the angular velocity of the mobile robot at each acquisition point from the recurrent neutral networks.

S230: Calculating the fitnesses of N mobile robots by using the fitness function with few variables and small constraint as the evaluation function.

S240: Selecting the recurrent neutral networks corresponding to the mobile robots with the greatest fitness, and duplicating the paternal chromosomes corresponding to the recurrent neutral networks as the progeny chromosomes Z1;

Selecting the recurrent neutral networks corresponding to the mobile robots with the fitness less than the fitness threshold S, and discarding the paternal chromosomes corresponding to the recurrent neutral networks;

Selecting the recurrent neutral networks corresponding to the mobile robots with the fitness greater than or equal to the fitness threshold S, duplicating one part of the paternal chromosomes corresponding to the recurrent neutral networks as the progeny chromosomes Z2, and obtaining the progeny chromosomes Z3 by dividing the other part of the paternal chromosomes into Part1 and Part2 and performing the evolutional operation of crossover and mutation respectively.

S250: Judging whether the current number of evolutions is greater than the maximum number of evolutions Gmax; if yes, then execute the next step; if not, then use the progeny chromosomes Z1, the progeny chromosomes Z2 and the progeny chromosomes Z3 as the new paternal chromosomes and return to step S220.

S300: Selecting the paternal chromosome corresponding to the maximum fitness value in each evolution to Gmax paternal chromosomes, and selecting a paternal chromosome with the maximum fitness value out of the Gmax paternal chromosomes as the global optimal individual.

S400: Obtaining the neutral networks corresponding to the global optimal individual in the S300, that is, the global optimal neutral networks.

Preferably, the following normalization processing is performed before the data acquired by the E sonic sensors are input into the beurons in a corresponding manner in the S100:

$$x'_i = \frac{\text{Max}V - x_1}{\text{Max}V - \text{Min}V}(i = 1, 2, \ldots, B) \qquad (1)$$

where, $x_i$ represents the data acquired by the sonic sensors, MaxV is the maximum value of the data acquired by the sonic sensors, and MinV is the minimum value of the data acquired by the sonic sensors.

Preferably, the specific process of the kth individual is obtained by using the real-number encoding of the C link weights of the tth recurrent neutral network in the S210 is shown below: the encoding length of the individual is equal to the number C of the link weights in the recurrent neutral networks, a gene in each individual represents a link weight, and each gene is represented by the real number within the range of [−2 2].

Preferably, the specific process of calculating the fitness of N recurrent neutral networks by using the fitness function with few variables and small constraint as the evaluation function in the S230 is shown below:

$$F(p)=F_{m1}(p) \oplus F_{m2}(p) \quad (2)$$

$$F_{m1}(p)=D-d \quad (3)$$

$$F_{m2}(p) = D + \frac{C}{Rn} \quad (4)$$

where, D represents the reward when the robot reaches the target point, d represents the distance between the final position and the target point of the robot, C is a constant, Rn represents the number of running steps when the robot reaches the target point, C/Rn represents the reward obtained according to the number of running steps; as shown in Formula (2) above, if the robot does not reach the target point, the value of the fitness function is Fm1 (p), and the value is obtained from Formula (3); if the robot reaches the target point, the value of the fitness function is Fm2 (p), and the value is obtained from Formula (4).

Preferably, the N fitnesses are stretched by using the simulated annealing idea after the fitnesses of N mobile robots are calculated in the S230. The specific method is shown below:

$$f_i = \frac{\exp(f_i/T)}{\sum_i^n \exp(f_i/T)} \quad (5)$$

where, T=T0 (0.99g−1), fi is the fitness of the ith individual, and n=N is the population size.

Preferably, the mutation operation of the link weight between the two beurons in the neutral networks is performed by combining Gaussian mutation and Cauthy mutation; suppose the genotype vector corresponding to a certain weight matrix X=(x₁, x₂, . . . , x_n), the new vector set obtained after the mutation is X'=(x'₁, x'₂, . . . , x'_n), the Formula for the mutation operation of the variables corresponding to the decision variable and the target variable is shown below:

$$\sigma'_i=\sigma_i * \exp(c_1 N(0,1)+c_2 C(0,1)) \quad (8)$$

$$x'_i=x_i+\sigma'_i * C(0,1) \quad (9)$$

where, $\sigma_i$, is the step size of the random mutation of a single variable (decision variable), $\sigma'^i$, is an intermediate variable, N (0, 1) is a standard normally-distributed random variable, C (0, 1) is a Cauthy random variable of t=1; c1 and c2 are selectivity factors.

Preferably, the specific process of performing the crossover evolutional operation of the paternal chromosomes in the Part1 in the S240 is shown below: selecting the two paternal chromosomes out of the paternal chromosomes in the Part1 randomly, generating the crossover positions randomly, and performing the crossover operation according to the crossover probability Pc; the expression of the crossover probability Pc is shown below:

$$P_c = \begin{cases} P_{c1} - \frac{(P_{c1}-P_{c2})(f'-f_{avg})}{f_{max}-f_{avg}} \frac{1}{1.0+\exp(-k_c\Omega)}, & f' \geq f_{avg} \\ P_{c1}, & f' < f_{avg} \end{cases} \quad (6)$$

where, f' is the larger fitness value out of the two fitness values corresponding to the paternal chromosomes to be crossed, fmax is the maximum fitness value among the current number of evolutions and the previous number of evolutions, favg is the mean fitness value of the populations among the current number of evolutions and the previous number of evolutions, Ω is a population diversity index, and Pc1, Pc2, kc and km are constants.

Preferably, the specific process of performing the mutation evolutional operation of the paternal chromosomes in the Part2 in the S240 is shown below: selecting the two paternal chromosomes out of the paternal chromosomes in the Part2 randomly, generating the mutation positions randomly, and performing the mutation operation according to the mutation probability Pm; the expression of the mutation probability Pm is shown below:

$$P_m = \begin{cases} P_{m1} - \frac{(P_{m1}-P_{m2})(f''-f_{avg})}{f_{max}-f_{avg}} \frac{1}{1.0+\exp(-k_m\Omega)}, & f'' \geq f_{avg} \\ P_{m1}, & f'' < f_{avg} \end{cases} \quad (7)$$

where, f' is the larger fitness value out of the two fitness values corresponding to the paternal chromosomes to be mutated, and Pm1, Pm2 and km are constants.

The path planning method combining the evolutional algorithms and the recurrent neutral networks is characterized in that, by using the global optimal neutral networks obtained according to the foregoing training methods, the real-time sensor data acquired in the motion of the mobile robot is input into the global optimal neutral networks, and the path taken by the mobile robot according to the global optimal neutral networks is the planned optimal path.

Compared with the prior art, the invention has at least the following advantages:

Applying the invention to training and optimization of the recurrent neutral networks by improving the evolutional algorithms can overcome the limitations of the gradient descent algorithms, and break through restriction of network structure and neuron type on the learning algorithms, which can exert the generalized mapping capability of the neutral networks, and bring the neutral networks fast convergence rate and strong learning capability. With high accuracy, safety and efficiency of motion, and excellent adaptability to the path planning of different scenarios, the invention can support the mobile robot to complete the path planning motion in various environments.

DESCRIPTION OF THE INVENTION

The invention will be further described in detail below.

Figure 1:
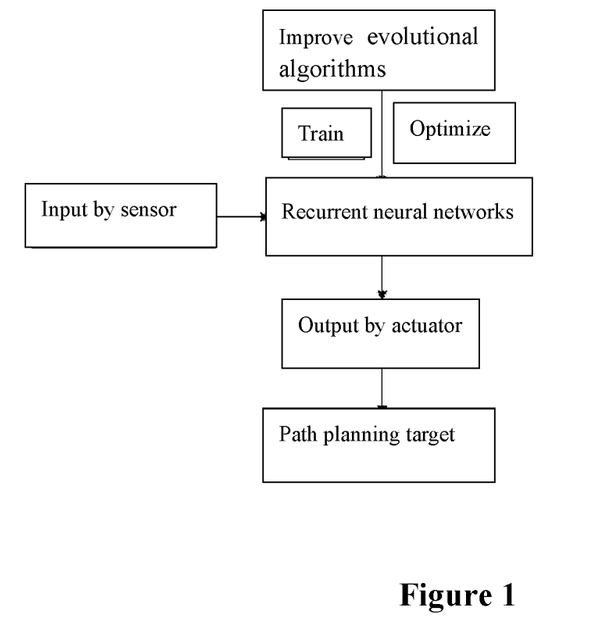
FIG. 1 is a flow diagram of the path planning algorithms that combines the evolutional algorithms and the recurrent neutral networks.
Figure 2:
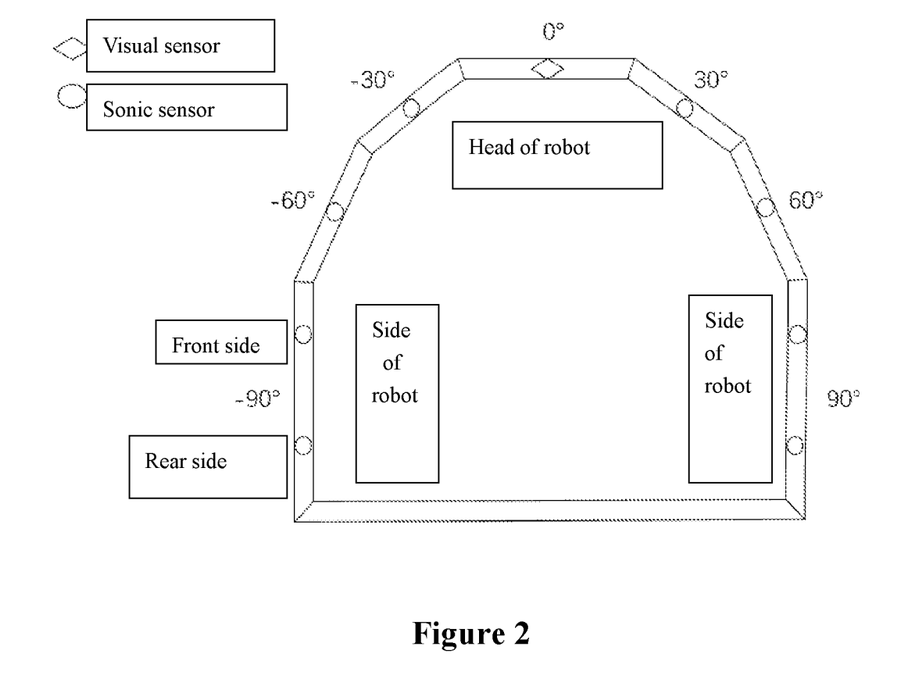
FIG. 2 is a layout diagram of the mobile robot sensor.
Figure 3:
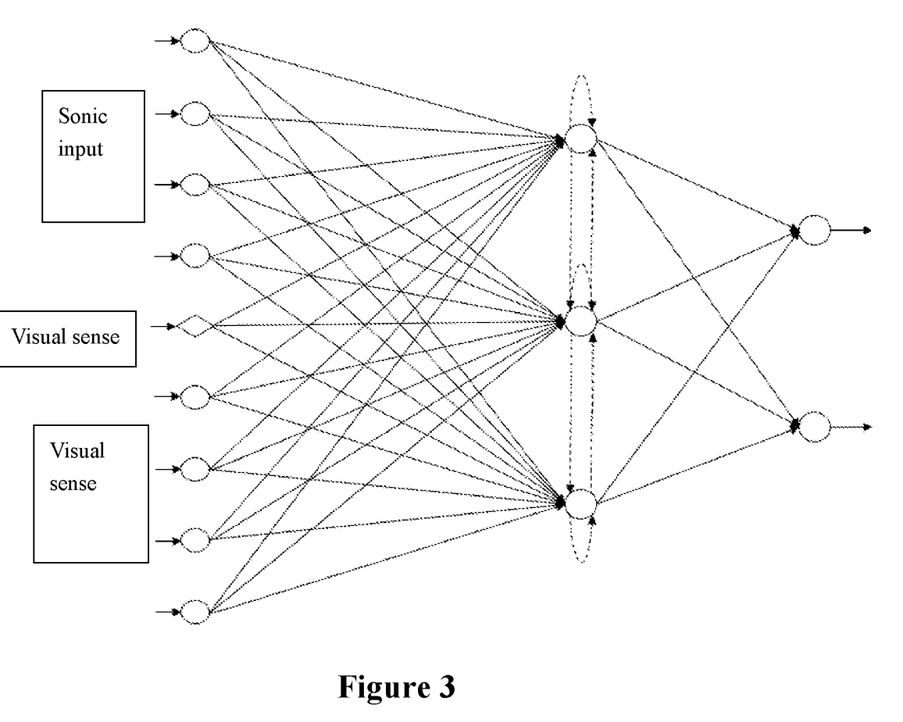
FIG. 3 is a structural diagram of the recurrent neutral networks modules.

Embodiment 1: With reference to the drawings 1-3, a neutral network training method based on the evolutional algorithms comprises the following steps:

S100: Constructing N recurrent neutral networks with the same structure, wherein the structure of the recurrent neutral networks is shown below: the neutral networks adopt the A-tier structure, the input tier has a total of B beurons, the output tier has two outputs, and the neutral networks have a total of C link weights.

Providing with N mobile robots, wherein each mobile robot is installed with the following acquisition structures: the D target sensors are installed on the head of the mobile robot, the same number of the sonic sensors, with a total of E sonic sensors, are respectively installed on both sides of the mobile robot, the D target sensors and the E sonic sensors respectively correspond to the B beurons in the input tier, D+E=B, the data acquired by the D target sensors and the data acquired by the E sonic sensors are input into the B beurons in a corresponding manner; in specific implementation, A=3, B=9, C=40, D=1, E=8, N=80.

Specifically: the neutral networks adopt a three-tier structure, wherein 9 beurons in the input tier respectively correspond to 1 target sensor and 8 sonic sensors; 3 beurons in the hidden tier are connected in feedback between their corresponding nodes and themselves; 2 beurons in the output tier respectively correspond to left and right motion-driven motors of the mobile robot; the beurons of the hidden tier and the output tier adopt the bipolar S-function as the activation function, and the corresponding weights are obtained through the evolutional algorithms.

The following normalization processing is performed before the data acquired by the E sonic sensors are input into the beurons in a corresponding manner in the S100:

$$x'_i = \frac{MaxV - x_i}{MaxV - MinV}(i = 1, 2, \ldots, B) \quad (1)$$

where, $x_i$ represents the data acquired by the sonic sensors, MaxV is the maximum value of the data acquired by the sonic sensors, and MinV is the minimum value of the data acquired by the sonic sensors. Specifically, xi is actually the information of distance from the obstacle obtained through the sonic sensors, MaxV is the maximum measuring distance output by the sonic sensors, MinV is the minimum measuring distance output by the sonic sensors; the D target sensors directly input the arc value of the angle of the current position and the target point to corresponding beurons in the input tier.

S200: Optimizing the recurrent neutral networks in S100 by using the evolutional algorithms as follows:

S210: Initializing N recurrent neutral networks, that is, assigning values to the link weights of the recurrent neutral networks according to the empirical value, and obtaining the kth individual by using the real-number encoding of the C link weights of the tth recurrent neutral network, wherein the kth individual is used as the first-generation chromosome of the evolutional algorithms, that is, paternal chromosome, t=k=1, 2 . . . N. A recurrent neutral network corresponds to a chromosome.

Setting the data acquisition step size of the D target sensors and the E sonic sensors, setting the maximum number of evolutions Gmax, setting the fitness threshold S, setting the number of populations N.

The specific process of the kth individual is obtained by using the real-number encoding of the C link weights of the tth recurrent neutral network in the S210 is shown below: the encoding length of the individual is equal to the number C of the link weights in the recurrent neutral networks, a gene in each individual represents a link weight, and each gene is represented by the real number within the range of [−2 2]. In specific implementation, putting together the strings corresponding to the link weights linked with the nodes in the same hidden tier can strengthen the link between the link weights at the same nodes in the hidden tier.

S220: Determining the start point and the target point for N mobile robots, in specific implementation, in a two-dimensional coordinate system, determining the start point and the target point for N mobile robots, inputting the data acquired by the D target sensors and the data acquired by the E sonic sensors in each mobile robot into the B beurons of the input tier of the recurrent neutral networks in S210 in a corresponding manner, and outputting the linear velocity and the angular velocity of the mobile robot at each acquisition point from the recurrent neutral networks.

S230: Determining the motion of the robots by using the fitness function for specific behaviors, reducing the search space in the robot evolution process, and calculating the fitnesses of N mobile robots by using the fitness function with few variables and small constraint as the evaluation function; the specific process is shown below:

$$F(p) = F_{m1}(p) \oplus F_{m2}(p) \quad (2)$$

$$F_{m1}(p) = D - d \quad (3)$$

$$F_{m2}(p) = D + \frac{C}{Rn} \quad (4)$$

where, D represents the reward when the robot reaches the target point, d represents the distance between the final position and the target point of the robot, C is a constant, Rn represents the number of running steps when the robot reaches the target point, C/Rn represents the reward obtained according to the number of running steps; as shown in Formula (2) above, if the robot does not reach the target point, the value of the fitness function is Fm1 (p), and the value is obtained from Formula (3); if the robot reaches the target point, the value of the fitness function is Fm2 (p), and the value is obtained from Formula (4). All individuals in the robot populations of each generation start running from the start point, and stop running when the robot reaches the target point, or collides with obstacles, or exceeds the maximum number of running steps.

The N fitnesses are stretched by using the simulated annealing idea after the fitnesses of N mobile robots are calculated in the S230; the specific method is shown below:

The fitnesses of individuals in the robot populations of each generation are stretched by using the simulated annealing idea, so that the progenies generated by the individuals with the similar fitness have close probability in the early stage of evolution, and the fitness difference between the individuals with the similar fitness is amplified to highlight the advantages of excellent individuals in the later stage of evolution. The stretching method is shown below:

$$f_i = \frac{\exp(f_i/T)}{\sum_i^n \exp(f_i/T)} \tag{5}$$

where, T=T0 (0.99g−1), fi is the fitness of the ith individual, and n=N is the population size.

S240: Selecting the recurrent neutral networks corresponding to the mobile robots with the greatest fitness, and duplicating the paternal chromosomes corresponding to the recurrent neutral networks as the progeny chromosomes Z1.

Selecting the recurrent neutral networks corresponding to the mobile robots with the fitness less than the fitness threshold S, and discarding the paternal chromosomes corresponding to the recurrent neutral networks.

Selecting the recurrent neutral networks corresponding to the mobile robots with the fitness greater than or equal to the fitness threshold S, duplicating one part of the paternal chromosomes corresponding to the recurrent neutral networks as the progeny chromosomes Z2, and obtaining the progeny chromosomes Z3 by dividing the other part of the paternal chromosomes into Part1 and Part2 and performing the evolutional operation of crossover and mutation respectively; the number of the progeny chromosomes Z1, the progeny chromosomes Z2 and the progeny chromosomes Z3 is equal to that of the paternal chromosomes.

The indexes that characterize the degree of population diversity and the fitness values of the individuals in each generation are used to adaptively adjust the crossover probability and the mutation probability, which not only can ensure that the convergence rate of the algorithms is accelerated in the early stage of evolution to avoid premature phenomena, but also can ensure that the excellent individuals in the populations perform appropriate crossover and mutation.

In order to ensure that the mutation operation of the evolutional algorithms has a certain range and can be evenly distributed on the entire network structure, the mutation operation of the link weight between the two beurons in the neutral networks is performed by combining Gaussian mutation and Cauthy mutation; suppose the genotype vector corresponding to a certain weight matrix $X=(x_1, x_2, \ldots, x_n)$, the new vector set obtained after the mutation is $X'=(x'_1, x'_2, \ldots, x'_n)$; the Formula for the mutation operation of the variables corresponding to the decision variable and the target variable is shown below:

$$\sigma'_i = \sigma_i * \exp(c_1 N(0,1) + c_2 C(0,1)) \tag{8}$$

$$x'_i = x_i + \sigma'_i * C(0,1) \tag{9}$$

where $\sigma_i$ is the step size of the random mutation of a single variable (decision variable), $\sigma'_i$ is an intermediate variable, N (0, 1) is a standard normally-distributed random variable, C (0, 1) is a Cauthy random variable of t=1; c1 and c2 are selectivity factors. In the process of mutating the amount of the decision variables, the Gaussian distribution works near the origin, and the Cauthy distribution works in the two wings.

The specific process of performing the crossover evolutional operation of the paternal chromosomes in the Part1 in the S240 is shown below: selecting the two paternal chromosomes out of the paternal chromosomes in the Part1 randomly, generating the crossover positions randomly, and performing the crossover operation according to the crossover probability Pc; the expression of the crossover probability Pc is shown below:

$$P_c = \begin{cases} P_{c1} - \frac{(P_{c1}-P_{c2})(f'-f_{avg})}{f_{max}-f_{avg}} \frac{1}{1.0+\exp(-k_c\Omega)}, & f' \geq f_{avg} \\ P_{c1}, & f' < f_{avg} \end{cases} \tag{6}$$

where, f' is the larger fitness value out of the two fitness values corresponding to the paternal chromosomes to be crossed, fmax is the maximum fitness value among the current number of evolutions and the previous number of evolutions, favg is the mean fitness value of the populations among the current number of evolutions and the previous number of evolutions, $\Omega$ is a population diversity index, and Pc1, Pc2, kc and km are constants.

The specific process of performing the mutation evolutional operation of the paternal chromosomes in the Part2 in the S240 is shown below: selecting the two paternal chromosomes out of the paternal chromosomes in the Part2 randomly, generating the mutation positions randomly, and performing the mutation operation according to the mutation probability Pm; the expression of the mutation probability Pm is shown below:

$$P_m = \begin{cases} P_{m1} - \frac{(P_{m1}-P_{m2})(f''-f_{avg})}{f_{max}-f_{avg}} \frac{1}{1.0+\exp(-k_m\Omega)}, & f'' \geq f_{avg} \\ P_{m1}, & f'' < f_{avg} \end{cases} \tag{7}$$

where, f' is the larger fitness value out of the two fitness values corresponding to the paternal chromosomes to be mutated, and Pm1, Pm2 and km are constants.

S250: Judging whether the current number of evolutions is greater than the maximum number of evolutions Gmax; if yes, then execute the next step; if not, then use the progeny chromosomes Z1, the progeny chromosomes Z2 and the progeny chromosomes Z3 as the new paternal chromosomes and return to step S220;

S300: Selecting the paternal chromosome corresponding to the maximum fitness value in each evolution to Gmax paternal chromosomes, and selecting a paternal chromosome with the maximum fitness value out of the Gmax paternal chromosomes as the global optimal individual.

S400: obtaining the neutral networks corresponding to the global optimal individual in the S300, that is, the global optimal neutral networks.

Embodiment 2: A path planning method combining the evolutional algorithms and the recurrent neutral networks obtains the global optimal neutral networks by using the neutral network training method based on the evolutional algorithms described in the embodiment 1, the mobile robot is input into the global optimal neutral networks, and the path taken by the mobile robot according to the global optimal neutral networks is the planned optimal path.

Experimental Analysis:

With respect to the methods described in the invention, in order to highlight the innovation points of the invention, the comparative simulation experiment is performed by comparing such technology with the traditional recurrent neutral networks and the standard feedforward neutral networks respectively to obtain the data in the table below. In the simulation experiment, the sensors of the robots are set as 1 target sensor (visual sensor) and 8 sonic sensors (the sensor setting is shown in the drawing 2), the recurrent neutral network structure is set as 9 beurons in the input tier, 3 beurons in the hidden tier and 2 beurons in the output tier (the neutral network structure is shown in the drawing 3); the working environment of the robots is a two-dimensional space, represented by a50×50 coordinate system; the coordinate of the start point is (5,5), and the coordinate of the target point is (49, 49); the obstacles in the environment are randomly set; the best individual appeared in the 75th generation in the robot evolution process; we performed the path planning simulation experiment by using the best individual. (Remarks: The methods designed in the patent is referred to as "evolutional recurrent neutral network method", and the standard feedforward neutral network method is referred to as "evolutional feedforward neutral network method" accordingly; the traditional recurrent neutral network model parameters are selected for reference as follows: beuron self-feedback link weight w=0.7, beuron neighbourhood link weight η=6, and number of trainings is 75; because the principle of the neutral network method is different from that of traditional A* algorithms, Dijkstra algorithms, RRT algorithms or other path planning algorithms, there is no relevant comparative experiment.

TABLE 1

| Maps | Methods | Path Steps |
| --- | --- | --- |
| Map 1 (training environment) | Evolutional recurrent neutral network method | 61 |
| | Traditional recurrent neutral network method | 81 |
| Map 2 (random setting of obstacles) | Evolutional recurrent neutral network method | 56 |
| | Traditional recurrent neutral network method | 92 |

TABLE 2

| Maps | Methods | Path Steps |
| --- | --- | --- |
| Map 1 (training environment) | Evolutional recurrent neutral network method | 61 |
| | Evolutional feedforward neutral network method | 72 |
| Map 2 (random setting of obstacles) | Evolutional recurrent neutral network method | 67 |
| | Evolutional feedforward neutral network method | 79 |

From the above two tables, we can know that: although the three methods can reach the target point through training, there still exists a certain gap. In Table 1, compared with the traditional recurrent neutral network method, the evolutional recurrent neutral network method has less path steps; the reason is that the traditional recurrent neutral networks essentially use the gradient descent algorithms characterized by defects of complex training method and slow convergence rate, while the evolutional recurrent neutral network method does not have the above defects. In Table 2, compared with the evolutional feedforward neutral network method, the evolutional recurrent neutral network method has less path steps; the reason is that the feedforward neutral network controller does not have the ability to store previous information, and generates motion shock behavior in the obstacle avoidance process, while the evolutional recurrent neutral network method does not have the above defects.

The above embodiments are only used to illustrate technical solutions of the invention rather than to restrict them. Although the invention has been described in detail with reference to the preferred embodiments, those skilled in the art shall understand that, the technical solutions of the invention can be amended or replaced equivalently, without being divorced from purpose and scope of the technical solutions of the invention, which shall be covered within the scope of the claims of the invention.

The invention claimed is:

1. A neutral network training method based on the evolutional algorithms, comprising the following steps:

S100: constructing N recurrent neutral networks with the same structure, wherein the recurrent neutral networks comprising: the neutral networks adopt the A-tier structure, the input tier has a total of B beurons, the output tier has two outputs, and the neutral networks have a total of C link weights;

providing with N mobile robots, wherein each mobile robot is installed with the following acquisition structures: D target sensors are installed on the head of the mobile robot, the same number of the sonic sensors, with a total of E sonic sensors, are respectively installed on both sides of the mobile robot, the D target sensors and the E sonic sensors respectively correspond to the B beurons in the input tier, D+E=B, the data acquired by the D target sensors and the data acquired by the E sonic sensors are input into the B beurons;

S200: optimizing the recurrent neutral networks in S100 by using the evolutional algorithms as follows:

S210: initializing N recurrent neutral networks and obtaining $k^{th}$ individual by using the real-number encoding of the C link weights of the $t^{th}$ recurrent neutral network, wherein the $k^{th}$ individual is used as the first-generation chromosome of the evolutional algorithms, that is, paternal chromosome, t=k=1, 2 . . . N; setting the data acquisition step size of the D target sensors and the E sonic sensors, setting the maximum number of evolutions Gmax, setting the fitness threshold S, setting the number of populations N;

S220: determining the start point and the target point for N mobile robots in a location coordinate system, inputting the data acquired by the D target sensors and the data acquired by the E sonic sensors in each mobile robot into the B beurons of the input tier of the recurrent neutral networks in S210 in, and outputting linear velocity and angular velocity of the mobile robot at each acquisition point from the recurrent neutral networks;

S230: calculating the fitnesses of N mobile robots by using an evaluation function;

S240: selecting the recurrent neutral networks corresponding to the mobile robots with the greatest fitness, from the N recurrent neutral networks, and duplicating the paternal chromosomes corresponding to the recurrent neutral networks as progeny chromosomes Z1;

selecting the recurrent neutral networks corresponding to the mobile robots with the fitness less than the fitness threshold S, from the N recurrent neutral networks, and discarding the paternal chromosomes corresponding to the recurrent neutral networks;

selecting the recurrent neutral networks corresponding to the mobile robots with the fitness greater than or equal to the fitness threshold S, from the N recurrent neutral networks, duplicating one part of the paternal chromosomes corresponding to the recurrent neutral networks as the progeny chromosomes Z2, and obtaining the progeny chromosomes Z3 by dividing the other part of the paternal chromosomes into Part1 and Part2 and performing the evolutional operation of crossover and mutation respectively;

S250: judging whether the current number of evolutions is greater than the maximum number of evolutions Gmax; if yes, then execute the next step; if not, then use the progeny chromosomes Z1, the progeny chromosomes Z2 and the progeny chromosomes Z3 as the new paternal chromosomes and return to step S220;

S300: selecting the paternal chromosome corresponding to the maximum fitness value in each evolution to Gmax paternal chromosomes, and selecting a paternal chromosome with the maximum fitness value out of the Gmax paternal chromosomes as the global optimal individual;

S400: obtaining a global optimal neutral network based on the neutral network corresponding to the global optimal individual in the S300.

2. The neutral network training method based on the evolutional algorithms according to claim 1, wherein the following normalization processing is performed before the data acquired by the E sonic sensors are input into the beurons in the S100:

$$x'_i = \frac{\text{Max}V - x_i}{\text{Max}V - \text{Min}V}(i = 1, 2, \ldots, B) \tag{1}$$

where, $x_i$, represents the data acquired by the sonic sensors, MaxV is the maximum value of the data acquired by the sonic sensors, and MinV is the minimum value of the data acquired by the sonic sensors.

3. The neutral network training method based on the evolutional algorithms according to claim 1, wherein the specific process of the kth individual is obtained by using the real-number encoding of the C link weights of the tth recurrent neutral network in the S210 is shown below: the encoding length of the individual is equal to the number C of the link weights in the recurrent neutral networks, a gene in each individual represents a link weight, and each gene is represented by the real number within the range of [−2 2].

4. The neutral network training method based on the evolutional algorithms according to claim 1, wherein the specific process of calculating the fitness of N recurrent neutral networks by using an evaluation function in the S230 is shown below:

$$F(p) = F_{m1}(p) \oplus F_{m2}(p) \tag{2}$$

$$F_{m1}(p) = D - d \tag{3}$$

$$F_{m2}(p) = D + \frac{C}{Rn} \tag{4}$$

where, D represents the reward when the robot reaches the target point, d represents the distance between the final position and the target point of the robot, C is a constant, Rn represents the number of running steps when the robot reaches the target point, C/Rn represents the reward obtained according to the number of running steps; as shown in Formula (2) above, if the robot does not reach the target point, the value of the fitness function is $F_{m1}$ (p), and the value is obtained from Formula (3); if the robot reaches the target point, the value of the fitness function is $F_{m2}$ (p), and the value is obtained from Formula (4).

5. The neutral network training method based on the evolutional algorithms according to claim 4, wherein the N fitnesses are stretched by using the simulated annealing idea after the fitnesses of N mobile robots are calculated in the S230. The specific method is shown below:

$$f_i = \frac{\exp(f_i/T)}{\sum_i^n \exp(f_i/T)} \tag{5}$$

where, $T = T_0 (0.99^{g-1})$, f is the fitness of the $i^{th}$ individual, and n=N is the population size.

6. The neutral network training method based on the evolutional algorithms according to claim 5, wherein the mutation operation of the link weight between the two beurons in the neutral networks is performed by combining Gaussian mutation and Cauthy mutation; suppose the genotype vector corresponding to a certain weight matrix $X = (x_1, x_2, \ldots, x_n)$ the new vector set obtained after the mutation is $X' = (x'_1, x'_2, \ldots, x'_n)$; the Formula for the mutation operation of the variables corresponding to the decision variable and the target variable is shown below:

$$\sigma'_i = \sigma_i * \exp(c_1 N(0,1) + c_2 C(0,1)) \tag{8}$$

$$x'_i = x_i + \sigma'_i * C(0,1) \tag{9}$$

where, $\sigma_i$ is the step size of the random mutation of a single variable (decision variable), $\sigma'_i$ is an intermediate variable, N (0, 1) is a standard normally-distributed random variable, C (0, 1) is a Cauthy random variable of t=1; $c_1$ and $c_2$ are selectivity factors.

7. The neutral network training method based on the evolutional algorithms according to claim 6, wherein the specific process of performing the crossover evolutional operation of the paternal chromosomes in the Part1 in the S240 is shown below: selecting the two paternal chromosomes out of the paternal chromosomes in the Part1 randomly, generating the crossover positions randomly, and performing the crossover operation according to the crossover probability Pc; the expression of the crossover probability Pc is shown below:

$$P_c = \begin{cases} P_{c1} - \frac{(P_{c1} - P_{c2})(f' - f_{avg})}{f_{max} - f_{avg}} \cdot \frac{1}{1.0 + \exp(-k_c \Omega)}, & f' \geq f_{avg} \\ P_{c1}, & f' < f_{avg} \end{cases} \tag{6}$$

where, f' is the larger fitness value out of the two fitness values corresponding to the paternal chromosomes to be crossed, $f_{max}$ is the maximum fitness value among the current number of evolutions and the previous number of evolutions, $f_{avg}$ is the mean fitness value of the populations among the current number of evolutions and the previous number of evolutions, Ω is a population diversity index, and Pc1, Pc2, kc and km are constants.

8. The neutral network training method based on the evolutional algorithms according to claim 6, wherein the specific process of performing the mutation evolutional operation of the paternal chromosomes in the Part2 in the S240 is shown below: selecting the two paternal chromosomes out of the paternal chromosomes in the Part2 randomly, generating the mutation positions randomly, and performing the mutation operation according to the mutation probability $P_m$; the expression of the mutation probability $P_m$ is shown below:

$$P_m = \begin{cases} P_{m1} - \dfrac{(P_{m1} - P_{m2})(f'' - f_{avg})}{f_{max} - f_{avg}} \dfrac{1}{1.0 + \exp(-k_m \Omega)}, & f'' \geq f_{avg} \\ P_{m1}, & f'' < f_{avg} \end{cases} \quad (7)$$

where, f' is the larger fitness value out of the two fitness values corresponding to the paternal chromosomes to be mutated, and $P_{m1}$, $P_{m2}$ and km are constants.

* * * * *